United States Patent
Xu et al.

(10) Patent No.: US 12,500,532 B1
(45) Date of Patent: Dec. 16, 2025

(54) ONLINE FAULT IDENTIFICATION METHOD FOR CURRENT SENSOR, DIAGNOSIS APPARATUS, AND FAULT-TOLERANT CONTROL SYSTEM

(71) Applicant: Southwest Jiaotong University, Chengdu (CN)

(72) Inventors: Shuai Xu, Chengdu (CN); Guangtong Ma, Chengdu (CN); Chunxing Yao, Chengdu (CN); Sijia Wu, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 19/090,954

(22) Filed: Mar. 26, 2025

(30) Foreign Application Priority Data

Sep. 12, 2024   (CN) .......................... 202411279790.1

(51) Int. Cl.
| | | |
|---|---|---|
| *G01R 15/00* | (2006.01) | |
| *G01R 19/00* | (2006.01) | |
| *G01R 31/34* | (2020.01) | |
| *G01R 35/00* | (2006.01) | |
| *H02P 6/12* | (2006.01) | |

(52) U.S. Cl.
CPC ............ *H02P 6/12* (2013.01); *G01R 19/0092* (2013.01); *G01R 31/34* (2013.01); *G01R 35/00* (2013.01)

(58) Field of Classification Search
CPC ....... H02P 6/12; G01R 19/0092; G01R 31/34; G01R 35/00
USPC ..................................................... 318/400.08
See application file for complete search history.

(56) References Cited

U.S. PATENT DOCUMENTS

| | | | | |
|---|---|---|---|---|
| 5,304,905 A | * | 4/1994 | Iwasaki ................. | G05B 19/19 318/568.22 |
| 2006/0006825 A1 | * | 1/2006 | Inaguma ................. | H02P 21/22 318/807 |

(Continued)

FOREIGN PATENT DOCUMENTS

| | | |
|---|---|---|
| CN | 117972561 A | 5/2024 |
| WO | 2023216553 A1 | 11/2023 |

OTHER PUBLICATIONS

The first office action of counterpart CN application No. 202411279790.1 issued on Oct. 29, 2024.

(Continued)

*Primary Examiner* — Gabriel Agared
(74) *Attorney, Agent, or Firm* — The Sun IP Law (57) ABSTRACT

Disclosed are an online fault identification method for a current sensor, a diagnosis apparatus, and a fault-tolerant control system, relating to the technical field of diagnosis of faults of current sensors. The method includes defining a fault of the current sensor, and setting a corresponding label; then simulating a motor drive system, so as to obtain operation data in a normal mode and a fault mode, and making a data set; designing a neural network, and performing optimization processing on the neural network through the data set, so as to obtain an intelligent diagnosis model; and finally deploying the intelligent diagnosis model in an edge apparatus, so as to perform real-time online diagnosis on the fault of the current sensor; where the fault of the current sensor includes a saturation fault and a noise fault.

12 Claims, 9 Drawing Sheets

(56) References Cited

U.S. PATENT DOCUMENTS

2006/0064291 A1* 3/2006 Pattipatti ............ G05B 23/0251
 703/14
2008/0004840 A1* 1/2008 Pattipatti ............ G05B 23/0251
 702/183
2012/0001580 A1 1/2012 Zhang
2020/0387785 A1* 12/2020 He ...................... G06F 18/2413

OTHER PUBLICATIONS

Notification to Grant in counterpart CN application No. 202411279790.1 issued on Nov. 6, 2024.
Xie En, et al., Research on Speed Sensor Fault Diagnosis and Fault-Tolerant Control of Electric Vehicle Motor Drive Systems, Dec. 15, 2016.
Xu Shuai, Research on the Reliability Assessment and Improvement Methods of Switched Reluctance Machine System, Apr. 15, 2020.
Zhang Han, et al., Fault Diagnosis Method of Current Sensor for Permanent MagnetSynchronous Motor Based on Second-Order Difference, Apr. 10, 2022.

* cited by examiner

ONLINE FAULT IDENTIFICATION METHOD FOR CURRENT SENSOR, DIAGNOSIS APPARATUS, AND FAULT-TOLERANT CONTROL SYSTEM

CROSS-REFERENCE TO RELATED APPLICATION

The present disclosure claims the priority to the Chinese patent application No. 202411279790.1, titled "Online Fault Identification Method for Current Sensor, Diagnosis Apparatus, and Fault-tolerant Control System", filed to the China National Intellectual Property Administration on Sep. 12, 2024, which is incorporated herein in its entirety by reference.

TECHNICAL FIELD

The disclosure relates to the technical field of fault diagnosis of a current sensor, and in particular to an online fault identification method for a current sensor, a diagnosis apparatus, and a fault-tolerant control system.

BACKGROUND

At least two current sensors are required to be configured in a motor drive system, so as to achieve desirable control performance. However, because the motor drive system is vulnerable to electromagnetic interference and its application environment (such as vibration, a temperature, and humidity), devices are prone to aging or poor contact. In consequence, the fault probability of the current sensors increases. Faults of the current sensors probably lead to degradation of control performance and even affect stability of the entire motor drive system. Thus, an effective fault diagnosis strategy for a current sensor is required to ensure safe and reliable operation of the motor drive system.

In current research, a fault diagnosis strategy for a current sensor is principally divided into a model based method, a signal based method, or a data driven method. The model based method, a type of common fault diagnosis method, depends on an accurate mathematical model, and is sensitive to a system parameter mismatch. The signal based method aims at extracting a specific feature from a fault signal, but has a complex algorithm, a low diagnosis speed, and high sensitivity to changes in working conditions. In recent years, with rapid development of artificial intelligence, application of a data driven strategy to the field of fault diagnosis has been promoted by machine learning. However, most existing fault diagnosis strategies for current sensors are offline, and thus cannot achieve rapid and accurate real-time inference and online diagnosis.

SUMMARY

The disclosure provides an online fault identification method for a current sensor, a diagnosis apparatus, and a fault-tolerant control system.

The online fault identification method for a current sensor is provided. The method includes a fault of the current sensor is defined, and a corresponding label is set; then a motor drive system is simulated, so as to obtain operation data in a normal mode and a fault mode, and a data set is made; a neural network is designed, and optimization processing on the neural network is performed through the data set, so as to obtain an intelligent diagnosis model; and finally the intelligent diagnosis model is deployed in an edge apparatus, so as to perform real-time online diagnosis on the fault of the current sensor; where the fault of the current sensor includes a saturation fault and a noise fault.

In some embodiments, the saturation fault is defined as follows:

$$i(t) = \begin{cases} i_x(t), 0 \le t \le t_f \\ \text{Max}_c, i_x(t) \ge \text{Max}_c, t \ge t_f \\ i_x(t), \text{Min}_c \le i_x(t) \le \text{Max}_c, t \ge t_f \\ \text{Min}_c, i_x(t) \le \text{Min}_c, t \ge t_f \end{cases}$$

The noise fault is defined as follows:

$$i(t) = \begin{cases} i_x(t), 0 \le t \le t_f \\ i_x(t) + \varphi(t), t \ge t_f \end{cases}$$

In the formula, i(t) denotes an output current, $i_x(t)$ denotes a normal current without a fault, $t_f$ denotes a moment when the fault occurs, $\text{Max}_c$ and $\text{Min}_c$ denote a maximum limit and a minimum limit of the current sensor respectively, and $\varphi(t)$ denotes a noise of the sensor and is generally denoted by a zero-mean Gaussian white noise.

In some embodiments, a process for making the data set includes: the operation data in different modes are collected, and the labeling processing is performed according to corresponding mode conditions. The labeling processing includes performing numbering on the basis of a number of the current sensor in the motor drive system and a fault condition of the current sensor. For example, possible faults of an A-phase current sensor are numbered as 1, 2, 3, 4, and 5 respectively, and possible faults of a B-phase current sensor are numbered as 6, 7, 8, 9, and 10 respectively, and so on; and then the data set is formed by injecting a noise signal into labeled data. A length L of a signal collected is calculated as follows:

$$f_{Sc} = \frac{N_r p_n}{60},$$

$$T_{Sc} = \frac{1}{f_{Sc}}$$

$$L = f_{Sa} \times T_{Sc}$$

In the formula, $P_n$ denotes a number of pole pairs, $N_r$ denotes a rotation speed of a rotor, $f_{Sa}$ denotes a sampling frequency, $f_{Sc}$ denotes a fundamental frequency of a stator current of a motor, and $T_{Sc}$ denotes an operation cycle of the motor.

In some embodiments, the optimization processing includes: a, in a case that the data set include an electrical signal and a mechanical signal, the electrical signal is fused with the mechanical signal, and a fused signal is input into a plurality of feature map channels of a neural network model; b, the neural network model is trained and optimized through an optimization algorithm, so as to obtain an intermediate model; and c, lightweighting processing is performed on the intermediate model, so as to obtain the intelligent diagnosis model.

In some embodiments, the neural network model is trained and optimized includes the network is trained and evaluated through an adaptive moment estimation with weight decay (AdamW) algorithm, and an optimal hyperparameter of the network is automatically searched for through an Optuna module, so as to obtain the intermediate model; and the lightweighting processing includes the intermediate model is transformed into an open neural network exchange (ONNX) model, and then lightweight optimization and data quantization are performed on a network after transformation through TensorRT.

In some embodiments, wherein the fault of the current sensor further comprises a stuck-at fault, a disconnection fault, a zero drift fault, and a gain fault. The stuck-at fault is defined as follows:

$$i(t) = \begin{cases} i_x(t), 0 \le t \le t_f \\ K_s, t \ge t_f \end{cases}$$

The disconnection fault is defined as follows:

$$i(t) = \begin{cases} i_x(t), 0 \le t \le t_f \\ 0, t \ge t_f \end{cases}$$

The zero drift fault is defined as follows:

$$i(t) = \begin{cases} i_x(t), 0 \le t \le t_f \\ i_x(t) + K_z, t \ge t_f \end{cases}$$

The gain fault is defined as follows:

$$i(t) = \begin{cases} i_x(t), 0 \le t \le t_f \\ Gi_x(t), t \ge t_f \end{cases}$$

In the formula, i(t) denotes an output current, $i_x(t)$ denotes a normal current without a fault, $t_f$ denotes a moment when the fault occurs, and $K_1$, $K_2$, and G denote coefficients of the stuck-at fault, the zero drift fault, and the gain fault respectively.

In some embodiments, the intelligent diagnosis model is configured with an anti-misdiagnosis threshold, and in a case that a number of continuous diagnosis of one of the saturation fault and the noise fault reaches the anti-misdiagnosis threshold, occurrence of the type of fault is determined.

A diagnosis apparatus is provided. The diagnosis apparatus includes a memory, a compiler, and a microprocessor; where the memory stores an intelligent diagnosis model generated through the online fault identification method for a current sensor; the compiler compiles the intelligent diagnosis model in the memory into an inference engine; and the microprocessor performs online real-time diagnosis on a fault condition of the current sensor through the inference engine.

A fault-tolerant control system is provided. The fault-tolerant control system includes a diagnosis apparatus and a fault-tolerant control apparatus; where the fault-tolerant control apparatus is configured to provide a corresponding fault-tolerant strategy on the basis of a fault condition, so as to control a motor control system.

In some embodiments, the fault-tolerant control apparatus includes a current observer and a control module; in a case of diagnosing a current sensor for only one phase in a motor as having a fault, according to a theory that the sum of stator currents is zero, the control module re-constructs a stator current having a fault through a stator current without a fault; and in a case of diagnosing current sensors for two or more phases in a motor as having faults, the current observer outputs an observed current signal, a feedback current signal path is rapidly switched, and inaccurate measurement values of the current sensors are replaced by the observed current signal.

DETAILED DESCRIPTION OF THE EMBODIMENTS

In order to make the objectives, technical solutions, and advantages in examples of the disclosure clearer, the technical solutions in the examples of the disclosure are clearly and completely described below with reference to the accompanying drawings in the examples of the disclosure. Apparently, the examples described are some examples rather than all examples of the disclosure. Thus, the following detailed description of the examples of the disclosure provided in the accompanying drawings is not intended to limit the claimed scope of the disclosure, and merely indicates the selected examples of the disclosure. Based on the examples of the disclosure, all other examples derived by those skilled in the art without creative efforts fall within the scope of protection of the disclosure.

Figure 1:
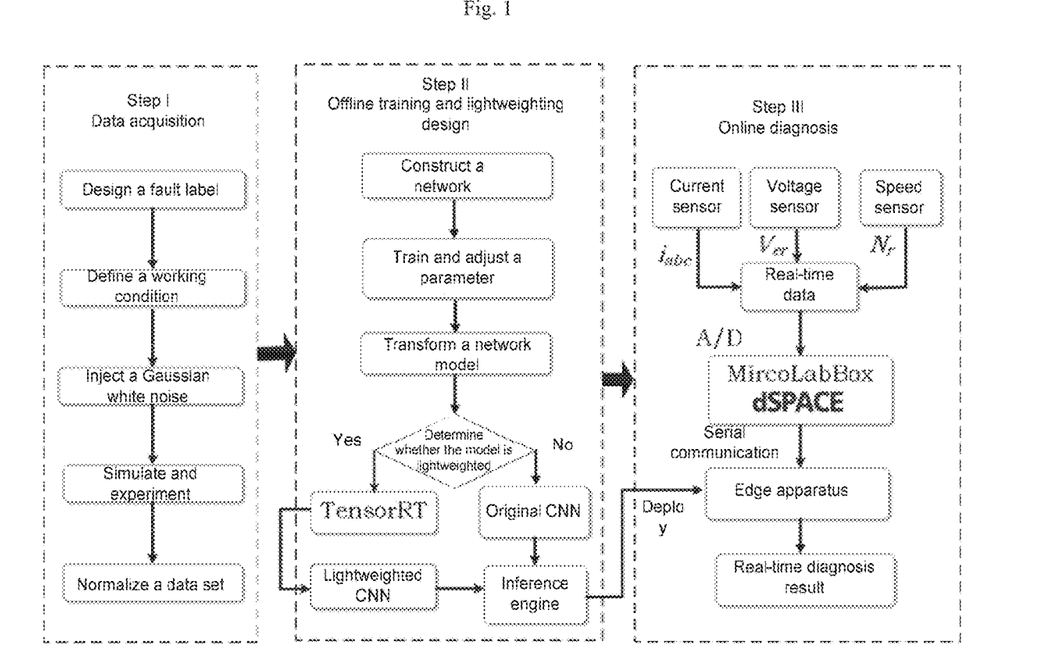
FIG. 1 is a flowchart of an online fault identification method for a current sensor involved in an example of the disclosure.

An online fault identification method for a current sensor is shown in FIG. 1. The method includes a fault of the current sensor is defined, and a corresponding label is set; then a motor drive system is simulated, so as to obtain operation data in a normal mode and a fault mode, and a data set is made; a neural network is designed, and optimization processing is performed on the neural network through the data set, so as to obtain an intelligent diagnosis model; and finally the intelligent diagnosis model is deployed in an edge apparatus, so as to perform online diagnosis on the fault of the current sensor; where the fault of the current sensor includes a saturation fault and a noise fault. Specifically, the intelligent diagnosis model, as an inference engine, is deployed in the edge apparatus.

Specifically, the motor drive system in the example is a permanent magnet synchronous motor. In order to design a closed-loop controller, a mathematical model of the permanent magnet synchronous motor in a synchronous rotating coordinate system (dq) is constructed and expressed as follows:

$$\frac{di_d}{dt} = \frac{u_d}{L_d} - \frac{R_s}{L_d}i_d + \frac{L_q}{L_d}\omega_r i_q$$

$$\frac{di_q}{dt} = \frac{u_q}{L_q} - \frac{R_s}{L_q}i_q - \frac{L_d}{L_q}\omega_r i_d - \frac{\psi}{L_q}\omega_r$$

In the formula, $u_{dq}$, $i_{dq}$, and $L_{dq}$ denote a stator voltage, a stator current, and a stator inductance on dq axes respectively, $\psi$ denotes a flux linkage of a permanent magnet, $\omega_r$ denotes an electric angular speed, and $R_s$ denotes stator resistance.

In addition, electromagnetic torque $T_m$ of the permanent magnet synchronous motor may be calculated according to a formula as follows:

$$T_m = \frac{3}{2} p_n i_q ((L_d - L_q)i_d + \psi)$$

In the formula, $p_n$ denotes a number of pole pairs of the permanent magnet.

A simulation model of the motor drive system is constructed through MATLAB/Simulink, and an experiment is performed. The operation data in the normal mode and the fault mode under different working conditions are collected to form an original data set, and labeled for subsequently training and evaluating the neural network. The operation data include a current signal (including $i_{abc}$ and $i_{dq}$ with a three-phase motor as an example), a neutral point voltage signal, and a rotation speed signal.

Specifically, in the example, a permanent magnet synchronous motor drive system is simulated and experimented through a finite control set model predictive control strategy, the current signals, neutral point voltage signals, and rotation speed signals in the normal mode and the fault mode are collected to form the original data set, and labeled for subsequently training and testing the network.

Figure 2:
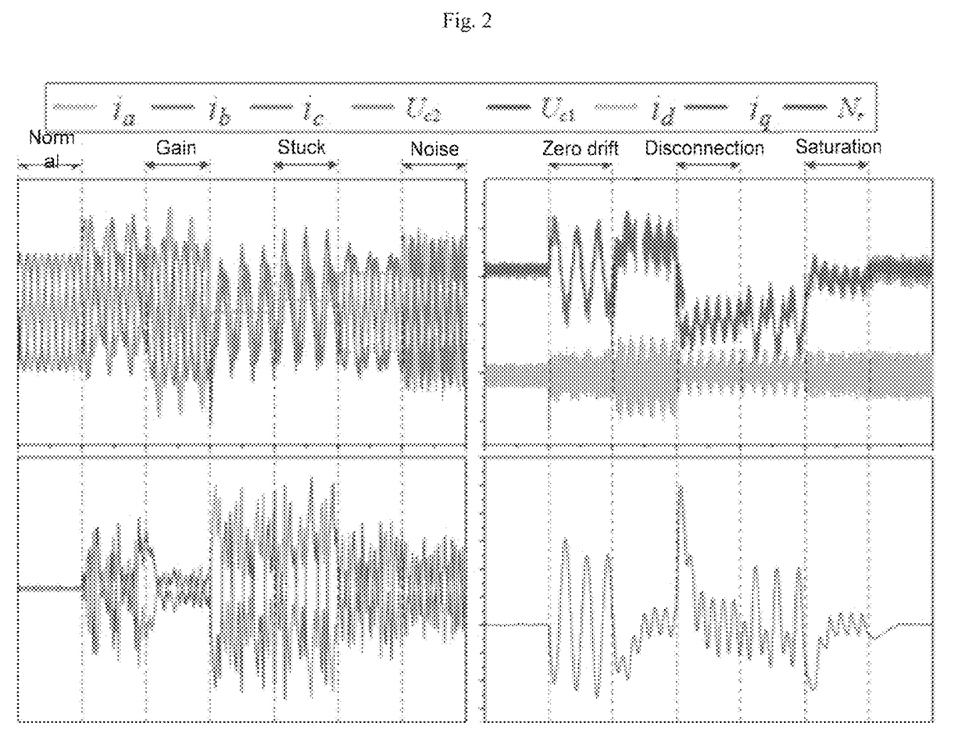
FIG. 2 shows waveform diagrams of 6 typical types of faults of a current sensor involved in an example of the disclosure.

Fault waveform diagrams of 6 types of faults of the current sensor, i.e. a stuck-at fault, a disconnection fault, a zero drift fault, a gain fault, a saturation fault, and a noise fault are shown in FIG. 2. It can be seen that these 6 types of faults dramatically aggravate fluctuation of a rotation speed ($N_r$) of a rotor, and also deteriorate balance performance of the neutral point voltages ($U_{c1}$ and $U_{c2}$). Since load torque ($T_m$) is calculated through $U_{c1}$, fluctuation of $i_{dq}$ also causes dramatic fluctuation of $T_m$. Thus, it is of great importance to rapidly and accurately diagnose these 6 types of faults of the sensor, so as to avoid performance degradation of the motor drive system.

In another example, the fault of the current sensor includes a saturation fault and a noise fault. The saturation fault is defined as follows:

$$i(t) = \begin{cases} i_x(t), 0 \le t \le t_f \\ \text{Max}_c, i_x(t) \ge \text{Max}_c, t \ge t_f \\ i_x(t), \text{Min}_c \le i_x(t) \le \text{Max}_c, t \ge t_f \\ \text{Min}_c, i_x(t) \le \text{Min}_c, t \ge t_f \end{cases} (x = a, b, c)$$

The noise fault is defined as follows:

$$i(t) = \begin{cases} i_x(t), 0 \le t \le t_f \\ i_x(t) + \varphi(t), t \ge t_f \end{cases} (x = a, b, c)$$

In the formula, i(t) denotes an output current, $i_x(t)$ denotes a normal current without a fault, $t_f$ denotes a moment when the fault occurs, $\text{Max}_c$ and $\text{Min}_c$ denote a maximum limit and a minimum limit of the current sensor respectively, and $\varphi(t)$ denotes a noise of the sensor and is generally denoted by a zero-mean Gaussian white noise.

In yet another example, a process for making the data set includes: the operation data in different modes are collected; then labeling processing is performed according to corresponding mode conditions; and finally a noise signal is injected into labeled data, so as to form the data set; where a length L of a signal collected is calculated as follows:

$$f_{Sc} = \frac{N_r p_n}{60},$$

$$T_{Sc} = \frac{1}{f_{Sc}}$$

$$L = f_{Sa} \times T_{Sc}$$

In the formula, $P_n$ denotes a number of pole pairs, $N_r$ denotes a rotation speed of a rotor, $f_{Sa}$ denotes a sampling frequency, $f_{Sc}$ denotes a fundamental frequency of a stator current of a motor, and $T_{Sc}$ denotes an operation cycle of the motor.

Figure 3:
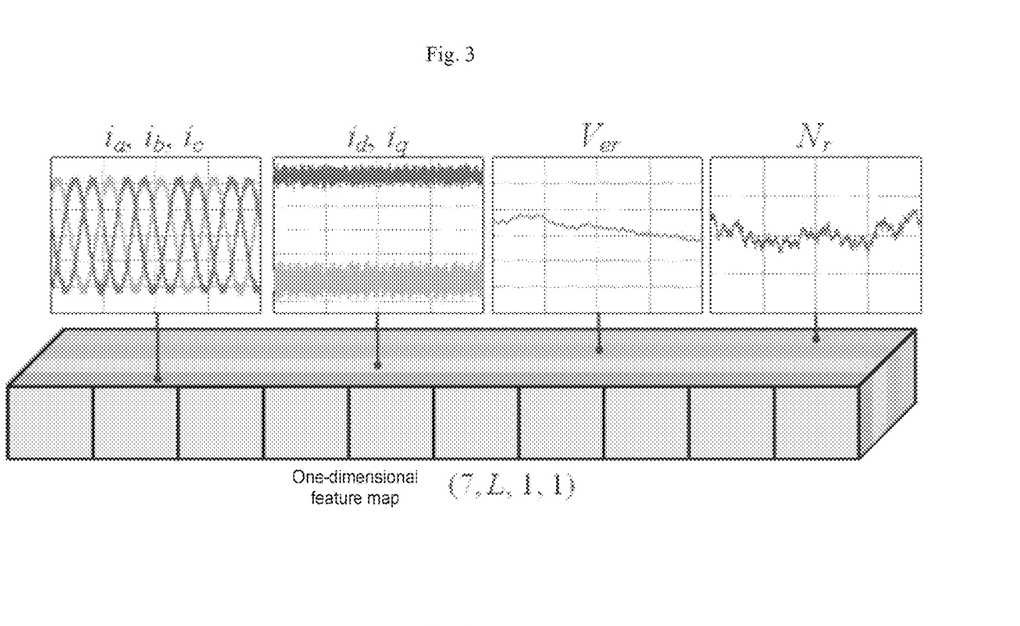
FIG. 3 is a multi-source information fused feature map involved in an example of the disclosure.

Due to the periodicity of the fault of the current sensor, a frequency of a fault wave corresponds to a fundamental frequency ($f_{Sc}$) of the stator current of the motor, so that the length of the signal collected is set specifically, where $P_n$ and $f_{Sa}$ are defined as 2 kHz and 20 kHz respectively. Thus, a length of each signal is 2000. Since FIG. 3 shows 7 types of signals, 14000 sampling points are required for data samples in total.

Figure 4:
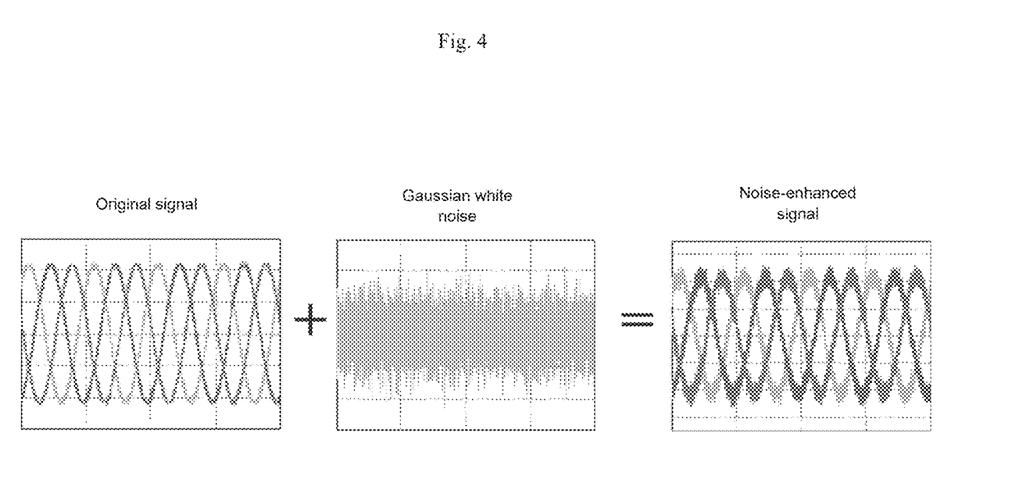
FIG. 4 is a schematic diagram of noise injection involved in an example of the disclosure.

A Gaussian white noise having a signal-to-noise ratio ranging from 19.02 dB to 25 dB is injected into the data, as shown in FIG. 4, so as to improve the robustness of the convolutional neural network to noise interference in practical applications. When the data have a signal-to-noise ratio less than 19.02 dB, the fault is defined as the noise fault. Next, the data set generated is normalized to eliminate the influence of a signal amplitude on diagnosis under changes of the working conditions. Such normalization processing improves accuracy of diagnosis of a trained neural network model under different working conditions.

A normalized data set is divided into a training set (70%), a cross-validation set (15%), and a test set (15%). A two-dimensional convolutional neural network is trained with the training set. A train network is evaluated with the cross-validation set. A generalization ability of the network is finally validated with the test set.

In yet another example, the fault of the current sensor further includes a stuck-at fault, a disconnection fault, a zero drift fault, and a gain fault. The stuck-at fault is defined as follows:

$$i(t) = \begin{cases} i_x(t), 0 \le t \le t_f \\ K_s, t \ge t_f \end{cases} (x = a, b, c)$$

The disconnection fault is defined as follows:

$$i(t) = \begin{cases} i_x(t), 0 \le t \le t_f \\ 0, t \ge t_f \end{cases} (x = a, b, c)$$

The zero drift fault is defined as follows:

$$i(t) = \begin{cases} i_x(t), 0 \le t \le t_f \\ i_x(t) + K_z, t \ge t_f \end{cases} (x = a, b, c)$$

The gain fault is defined as follows:

$$i(t) = \begin{cases} i_x(t), 0 \le t \le t_f \\ Gi_x(t), t \ge t_f \end{cases} (x = a, b, c)$$

In the formula, i(t) denotes an output current, $i_x(t)$ denotes a normal current without a fault, $t_f$ denotes a moment when the fault occurs, and $K_s$, $K_z$, and G denote coefficients of the stuck-at fault, the zero drift fault, and the gain fault respectively.

Specifically, with a three-phase motor as an example, corresponding labels defined for 6 different types of faults of the current sensor in three phases are shown in Table 1.

Particularly, the noise fault generally affects each current sensor in the motor drive system. Thus, a label for the noise fault considers an entire current sensor system rather than individual sensors.

TABLE 1

Fault of Current Sensor and Corresponding Fault Label

| Sensor fault | Zero drift fault | Gain fault | Disconnection fault | Stuck-at fault | Saturation fault |
|---|---|---|---|---|---|
| Label (A phase) | 1 | 2 | 3 | 4 | 5 |
| Label (B phase) | 6 | 7 | 8 | 9 | 10 |
| Label (C phase) | 11 | 12 | 13 | 14 | 15 |
| Label (normal) 0 | 19.02 db 16 | 18 db 17 | Label (noise fault) 17.5 db 18 | 17.25 db 19 | 17 db 20 |

In yet another example, the optimization processing includes: a, in a case that the data set include an electrical signal and a mechanical signal, the electrical signal is fused with the mechanical signal, and a fused signal is input into a plurality of feature map channels of a neural network model; b, the neural network model is trained and optimized through an optimization algorithm, so as to obtain an intermediate model; and c, lightweighting processing is performed on the intermediate model, so as to obtain the intelligent diagnosis model.

Figure 5:
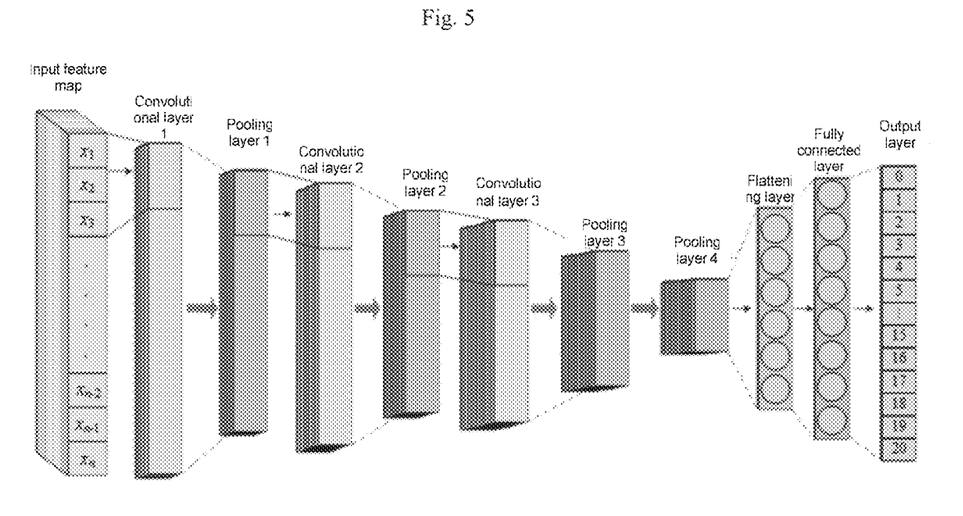
FIG. 5 shows a framework of a one-dimensional convolutional neural network model involved in an example of the disclosure.

Specifically, a one-dimensional convolutional neural network serves as the neural network model, a framework of which is shown in FIG. 5. The neural network model includes a convolutional module, a max pooling layer, a flattening layer, and a fully connected layer. Specifically, a feature is first extracted from the fault by the convolutional layer, and then the feature extracted is standardized by a batch normalization layer, so that network training is more rapid and stabler. In addition, a rectified linear unit (ReLU) is selected as an activation function to extract a nonlinear feature from the network. The structure is simple and has the function of preventing gradient vanishing and gradient exploding. A mathematical expression of the ReLU may be as follows:

$$ReLU(x) = \max(0, x)$$

After the feature is extracted by the convolutional module, the max pooling layer reduces a size of a feature map while preserving the most important feature of the data for further extraction. Subsequently, the feature extracted is converted into diagnosis results by the flattening layer and the fully connected layer. These results are transmitted to an output layer. A specific structure of the neural network is developed and designed by PyTorch.

In yet another example, the step that the neural network model is trained and optimized includes the network is trained and evaluated through an adaptive moment estimation with weight decay (AdamW) algorithm, and an optimal hyperparameter of the network is automatically searched for through an Optuna module, so as to obtain the intermediate model. The lightweighting processing includes the intermediate model is transformed into an open neural network exchange (ONNX) model, and then lightweight optimization and data quantization are performed on a network after transformation through TensorRT. Thus, a parameter size and storage and computation demand of the network are reduced, so that a diagnosis speed is increased.

Subsequently, the data set divided is input into the convolutional neural network, and the network is trained and evaluated through the AdamW algorithm. Compared with an ordinary Adam algorithm, the algorithm can avoid the influence of weight decay on gradient and improve the generalization ability of the network.

In yet another example, the intelligent diagnosis model is configured with an anti-misdiagnosis threshold, and in a case that a number of continuous diagnosis of one of the saturation fault and the noise fault reaches the anti-misdiagnosis threshold, occurrence of the type of fault is determined. The setting herein is for a fault type having no 100% accuracy in model generalization ability validation. Since the saturation fault and the noise fault have no 100% accuracy in validation results, the anti-misdiagnosis threshold is set for these two faults. In the example, the anti-misdiagnosis threshold is set to 2.

Figure 6:
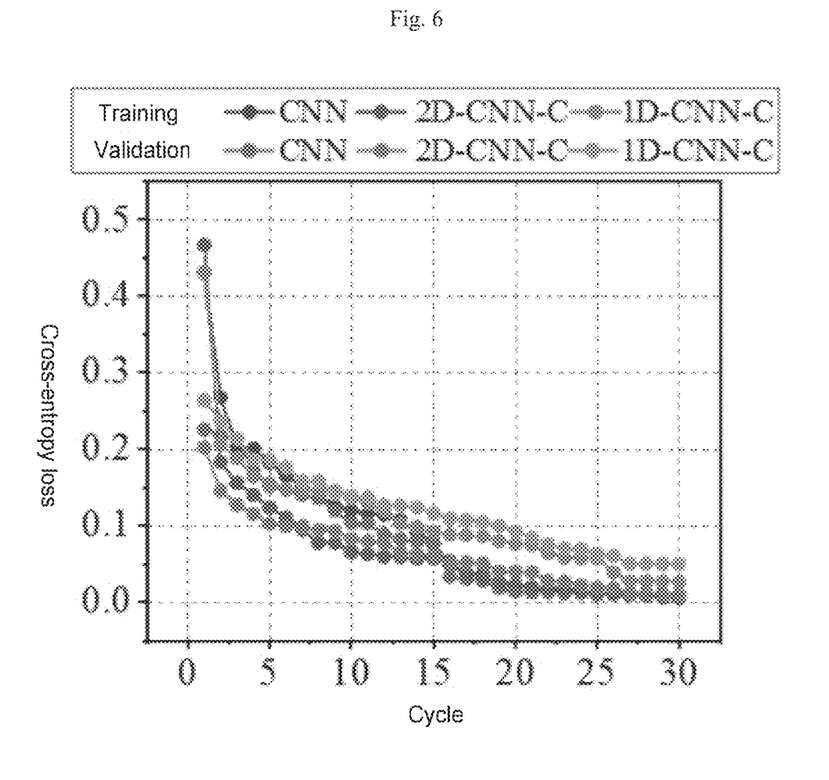
FIG. 6 is a diagram of comparison results of training performance [cross entropy loss] of different convolutional neural networks involved in an example of the disclosure.
Figure 7:
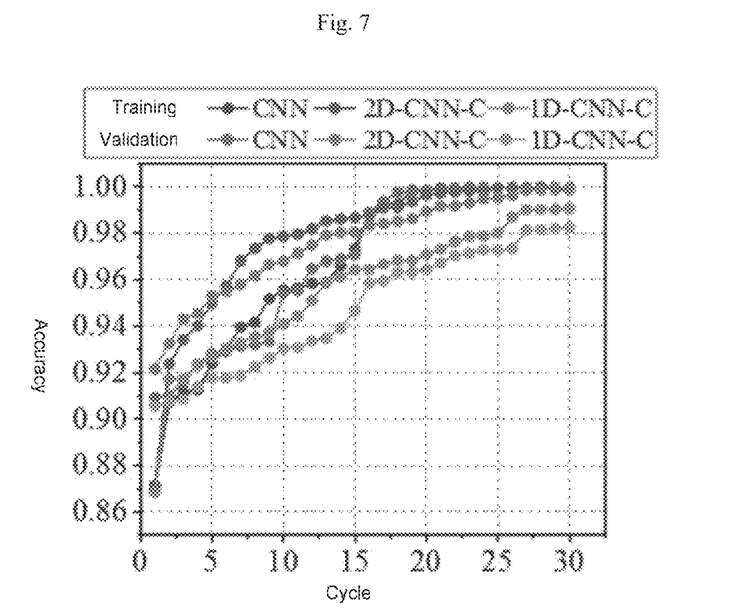
FIG. 7 is a diagram of comparison results of training performance [accuracy] of different convolutional neural networks involved in an example of the disclosure.

Specifically, FIGS. 6-7 show training performance of the designed lightweight one-dimensional convolutional neural network (1D-CNN, with multi-source fusion of the electrical signal and the mechanical signal). It can be seen that the accuracy and cross-entropy loss of the designed 1D-CNN are better than those of a one-dimensional convolutional neural network (1D-CNN-C, with only the electrical signal fused). Thus, the advantages of multi-source information fusion of the input feature map are validated. Although the accuracy and training loss of a two-dimensional convolutional neural network (2D-CNN-C, with only the electrical signal fused) are similar to those of the 1D-CNN, a parameter size of the 2D-CNN-C is almost six times that of the 1D-CNN. Thus, a larger parameter size of the 2D-CNN-C increases a computation cost and decreases a diagnosis speed. On the basis of comparison results in FIGS. 6-7 and Table 2, the network 1D-CNN designed in the example is more suitable for edge deployment and online diagnosis regardless of precision of diagnosis or parameter size.

TABLE 2

Comparison of Parameter Size and Performance of Network

| Network | Lightweight 1D-CNN | 1D-CNN-C | 2D-CNN-C |
|---|---|---|---|
| Parameter Size | 288597 | 288309 | 1488147 |
| Floating-point operations per second (FLOPs) | 16.5342 giga floating-point operations per second (GFLOPs) | 16.4789 GFLOPs | 229.6394 GFLOPs |
| Training Accuracy | 99.81% | 98.73% | 99.85% |
| Validation Accuracy | 99.62% | 98.14% | 99.64% |

Figure 8:
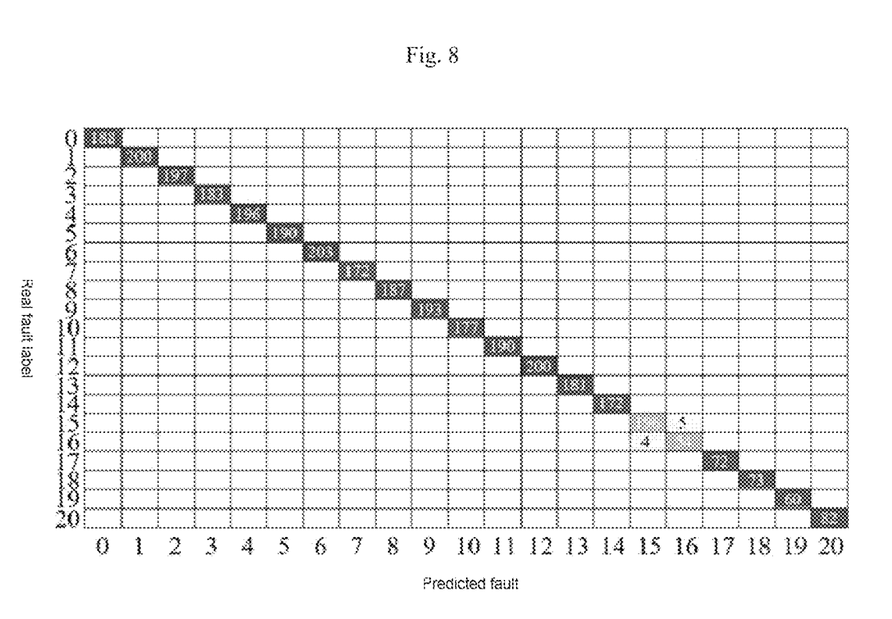
FIG. 8 is a confusion matrix for validating a generalization ability of a one-dimensional convolutional neural network involved in an example of the disclosure.

FIG. 8 shows a predicted result of a confusion matrix of the test set. As shown in FIG. 8, only 5 samples having a true label 15 (C-phase saturation fault) are mispredicted as having a label 16 (19.02 dB noise fault), and 4 samples having a true label 16 are mispredicted as having a label 15. This indicates that except for the C-phase saturation fault having the diagnosis accuracy of 97.3% and the 19.02 dB noise fault having the diagnosis accuracy of 93.1%, the other types of faults have the diagnosis accuracy as high as 100%. The overall predicted accuracy for the test set is as high as 99.7300, demonstrating the generalization ability of the lightweight 1D-CNN.

Figure 9:
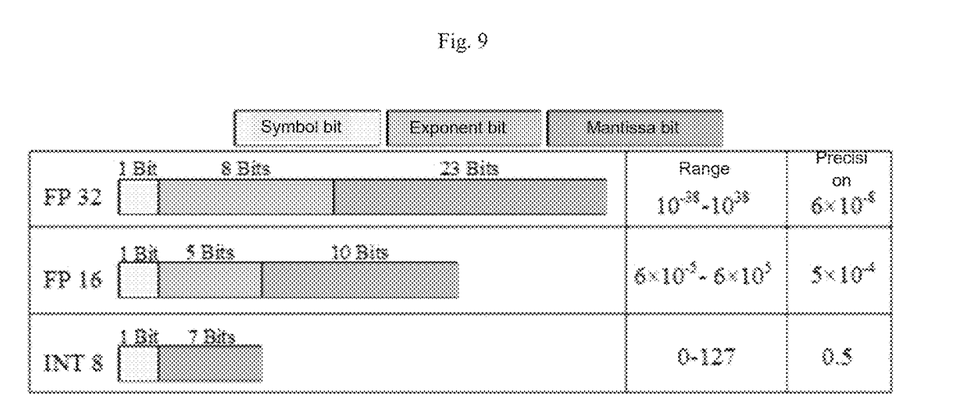
FIG. 9 is a diagram of atypical bit width of TensorRT based data quantization involved in an example of the disclosure.

In order to design the lightweighted network, the trained network is transformed into the ONNX model, and the lightweight optimization and data quantization are performed on the network after transformation through the TensorRT. During the lightweight optimization, multi-stream execution and core autotuning are designed to optimize efficiency of a graphics processing unit (GPU) compute unified device architecture (CUDA), so that the diagnosis speed is increased. In addition, the parameter size and computation demand of the network after transformation are reduced through precise calibration, layer fusion, and a dynamic tensor memory. During the data quantization, the model is compressed by reducing a bit width of values in a deep neural network, so that the storage and computation demand is reduced. FIG. 9 shows a diagram of a typical bit width of TensorRT-based data quantization. As shown in Table 3, a quantization index of FP16 achieves the lowest FLOPs and almost the same precision, and thus is the optimal selection for the lightweight optimization of the 1D-CNN.

TABLE 3

Comparison of Various Lightweight Networks

| Network | Parameter Size | FLOPs | Prediction Precision |
|---|---|---|---|
| Original CNN without TensorRT | 288597 | 16.5342 GFLOPs | 99.81% |
| Lightweight CNN with FP 32 | 8025 | 1.9654 GFLOPs | 99.76% |
| Lightweight CNN with FP 16 | 5792 | 1.2241 GFLOPs | 99.74% |

With TensorRT based optimization, the lightweight 1D-CNN is formed into an inference engine, and then the inference engine is deployed in the edge apparatus Jetson, so as to realize online diagnosis of the fault of the current sensor. In addition, in order to prevent occurrence of misdiagnosis, the diagnosis threshold is designed to improve the accuracy of diagnosis.

For difficulties encountered in distinguishing between the saturation fault 15 and the noise fault 16 (19.02 dB), repeated diagnosis is performed by introducing the threshold, so as to prevent misdiagnosis during edge deployment. Specifically, the anti-misdiagnosis threshold is defined to avoid the occurrence of misdiagnosis. A balance between diagnosis time and predicted accuracy is considered in a process of setting the anti-misdiagnosis threshold, so that the diagnosis speed is ensured while misdiagnosis is reduced. The anti-misdiagnosis threshold is set to 2 herein. When a number of continuous misdiagnosis of one of the saturation fault and the noise fault reaches the anti-misdiagnosis threshold, the occurrence of the type of fault is determined.

The intelligent diagnosis model, i.e., the lightweight 1D-CNN, is transformed into the inference engine after the TensorRT based optimization, and the inference engine is deployed in the graphics processing unit (GPU).

An experimental platform of a permanent magnet motor drive system fed by a three-level converter is built to validate feasibility of the provided online fault identification method for a current sensor. A motor drive control strategy is embedded in a MicroLabBox real-time controller, the inference engine is deployed on the Jetson, and the fault of the current sensor and noise injection are triggered by a control module in the MicroLabBox. Real-time data and diagnosis results are transmitted to the Jeston and the MicroLabBox through serial communication lines respectively, so that online diagnosis of the fault of the sensor is realized.

Figure 10:
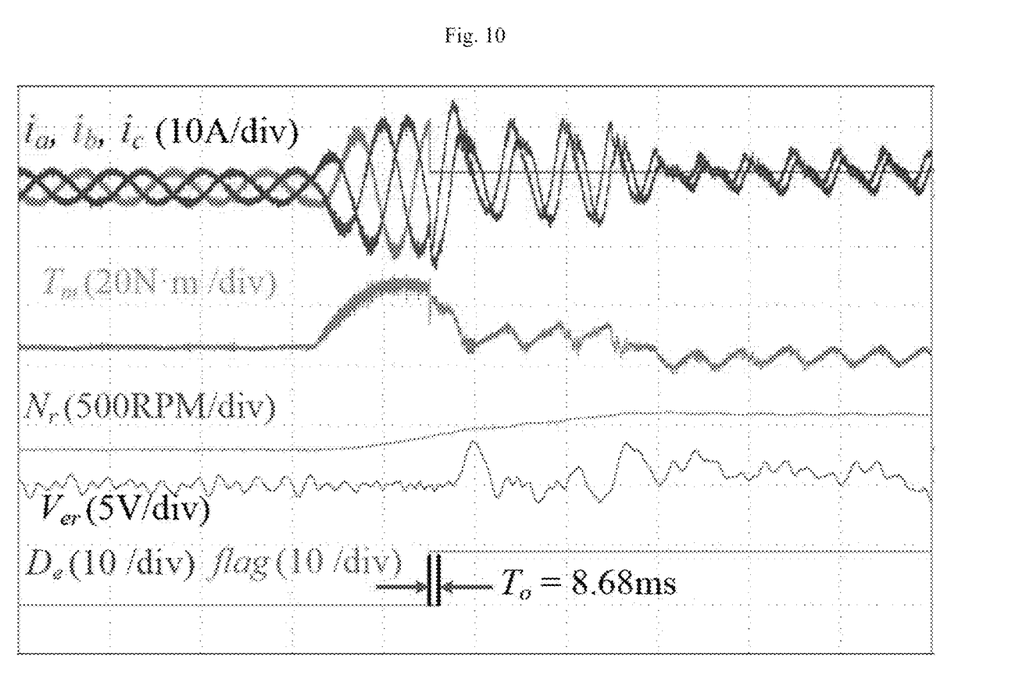
FIG. 10 shows a diagnosis result of a B-phase stuck-at fault under the influence of a noise according to a diagnosis strategy involved in an example of the disclosure.
Figure 11:
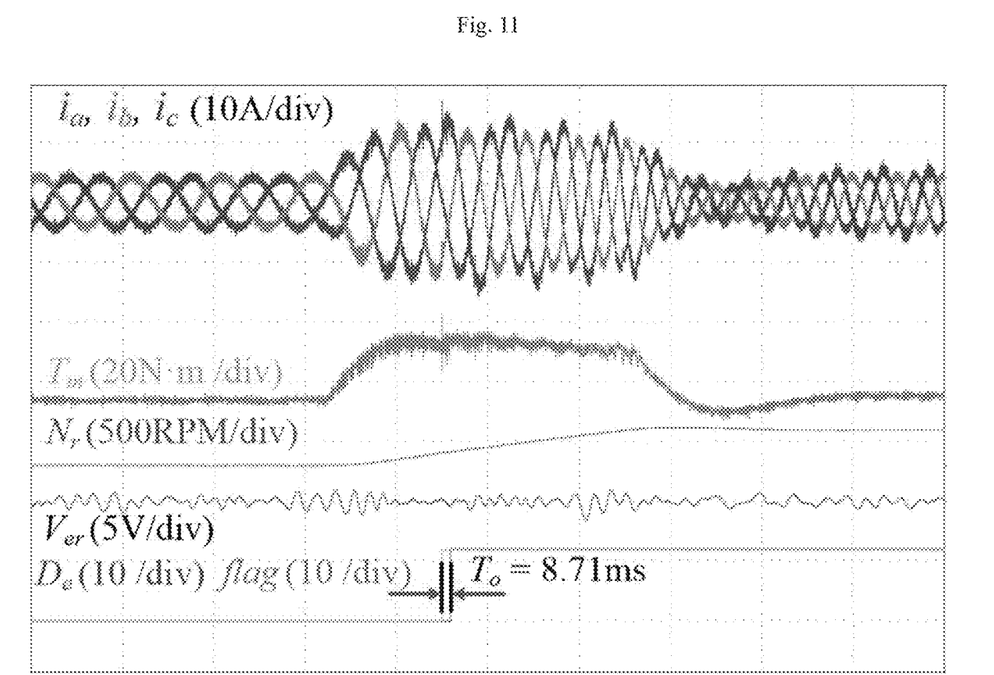
FIG. 11 is a diagnosis result of a C-phase gain fault under the influence of a noise according to a diagnosis strategy involved in an example of the disclosure.

FIGS. 10-13 show transient performance of the diagnosis method provided under different working conditions and different signal-to-noise ratios, where the fault of the current sensor is triggered when a rotation speed of the motor reaches 400 rpm. The curves in the figures include: three-phase current waveforms ($i_a$, $i_b$, and $i_c$), a torque waveform ($T_m$), a rotation speed waveform ($N_r$), a converter neutral point voltage deviation waveform ($V_{cr}$), a sensor fault trigger signal (De), a diagnosis result (flag), and an anti-misdiagnosis threshold count (Count). A fault diagnosis waveform ($T_0$) denotes the diagnosis time, i.e., a time difference between De and flag, reflecting lag time between fault occurrence and fault diagnosis. The shorter the lag time is, the better the real-time diagnosis performance is. Specifically, experiment conditions in FIG. 10 are as follows: $N_r$=300 RPM-600 RPM, $T_m$=10 N·m, $K_s$=0.75 $i_{mb}$, and SNR=19.05 dB; and experiment conditions in FIG. 11 are as follows: $N_r$=300 RPM-600 RPM, $T_m$=10 N·m, $K_s$=0.75 $i_{mc}$, and SNR=19.05 dB.

As shown in FIGS. 10-11, in a case of a transient condition, the diagnosis method provided can accurately identify the fault of the current sensor under noise interference, and the diagnosis time is 8.68 ms and 8.71 ms respectively.

Figure 12:
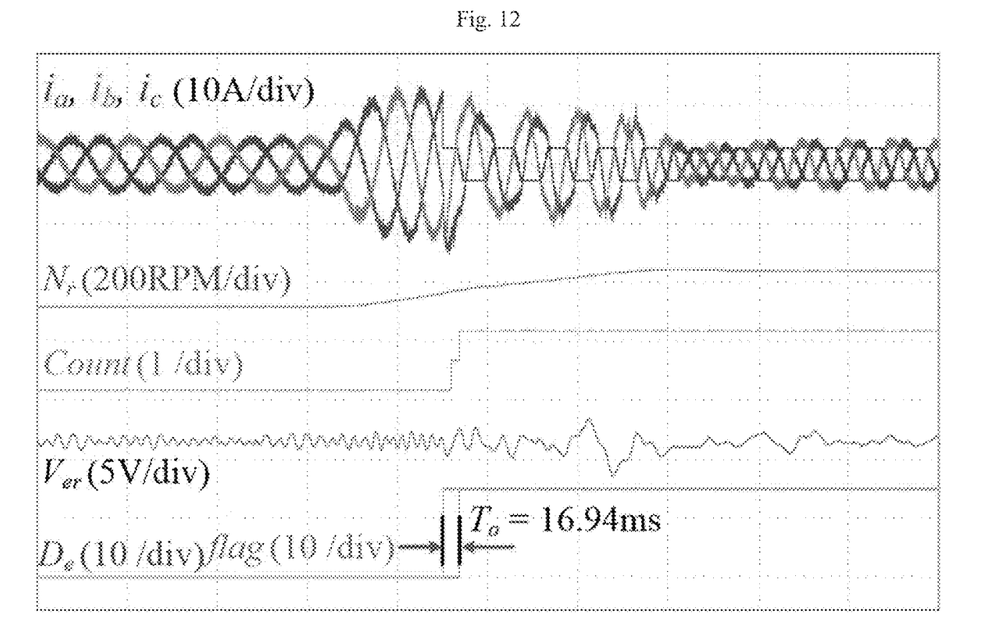
FIG. 12 shows a diagnosis result of a C-phase saturation fault under the influence of a noise according to a diagnosis strategy involved in an example of the disclosure.

Experiment conditions in FIG. 12 are as follows: $N_r$=300 RPM-600 RPM, $T_m$=10 N·m, $Max_c$ and $Min_c$=±06 $i_{mc}$, and SNR=19.05 dB.

Figure 13:
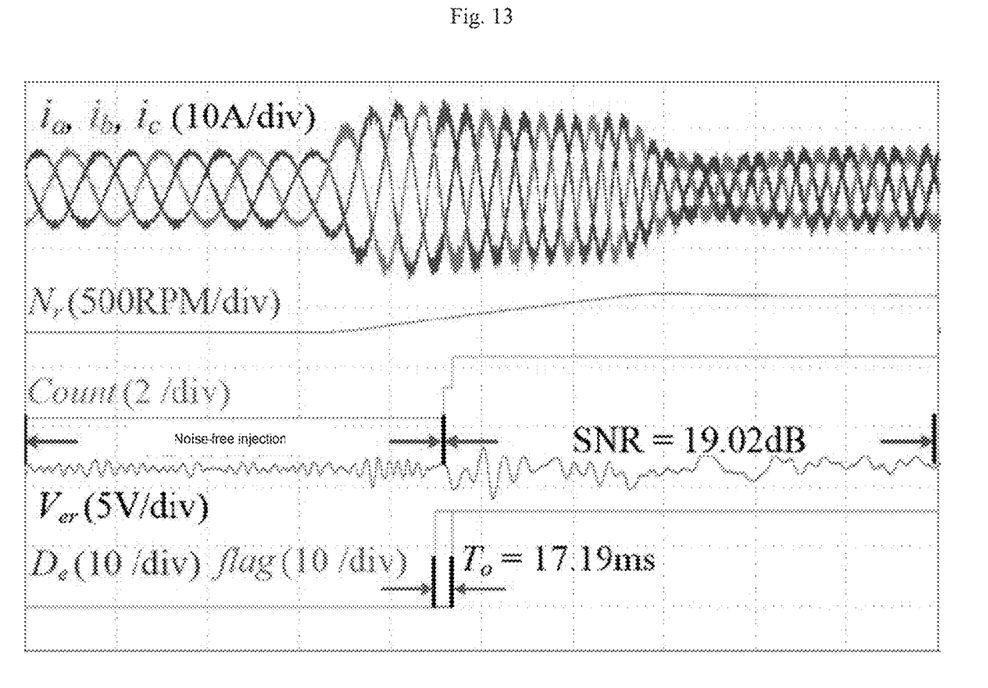
FIG. 13 shows a diagnosis result of a noise fault (having a signal-to-noise ratio (SNR)=19.02 dB) under the influence of a noise according to a diagnosis strategy involved in an example of the disclosure.

Experiment conditions in FIG. 13 are as follows: $N_r$=300 RPM-600 RPM, $T_m$=15 N·m, $K_s$=0.75 imb, and SNR=19.05 dB.

Experiment results in FIGS. 12-13 validate the feasibility of the designed anti-misdiagnosis strategy. Results shown in FIGS. 10-13 validate the effectiveness and feasibility of diagnosis of faults of the sensor under noise interference, and noise robustness under the transient condition, with the diagnosis time of 16.94 ms and 17.19 ms respectively.

In conclusion, according to the diagnosis method provided by the disclosure, the online diagnosis of the 6 type of faults of the sensor is realized, and real-time performance is excellent with each diagnosis time shorter than 20 ms.

In yet another example, the disclosure relates to a diagnosis apparatus. The diagnosis apparatus includes a memory, a compiler, and a microprocessor; where the memory stores an intelligent diagnosis model generated through an online fault identification method for a current sensor; the compiler compiles the intelligent diagnosis model in the memory into an inference engine; and the microprocessor performs online real-time diagnosis on a fault condition of the current sensor through the inference engine. In the example, an edge apparatus selected from the NVIDIA Jetson Xaiver series is used as the diagnosis apparatus.

Specifically, the intelligent diagnosis model, i.e. a lightweight 1D-CNN, is transformed into the inference engine after TensorRT based optimization, and the inference engine is deployed in a GPU. By comparing computation performance between a field-programmable gate array (FPGA) and the GPU, the GPU is selected as the edge apparatus to realize online diagnosis of faults of the sensor on the basis of comprehensive comparison of computation resources, costs, optimizers, and memories.

During practical operation, current signals (including iabc and idq, with a three-phase motor as an example) are collected by a current sensor, a neutral point voltage signal is collected by a voltage sensor, and a rotation speed signal is collected by a speed sensor.

Then, the above signals undergo analog to digital (AD) conversion, and then converted signals are transmitted to the MicrolabBox. The MicrolabBox transmits the signals to the edge apparatus through serial communications. The edge apparatus acquires real-time diagnosis results on the basis of information obtained.

In yet another example, the disclosure relates to a fault-tolerant control system. The fault-tolerant control system includes a diagnosis apparatus and a fault-tolerant control apparatus; where the fault-tolerant control apparatus is configured to provide a corresponding fault-tolerant strategy on the basis of a fault condition, so as to control a motor control system.

The fault-tolerant control apparatus includes a current observer and a control module; in a case of diagnosing a current sensor for only one phase in a motor as having a fault, according to a theory that the sum of stator currents is zero, the control module re-constructs a stator current having a fault through a stator current without a fault; and in a case of diagnosing current sensors for two or more phases in a motor as having faults, the current observer outputs an observed current signal, a feedback current signal path is rapidly switched, and inaccurate measurement values of the current sensors are replaced by the observed current signal.

Figure 14:
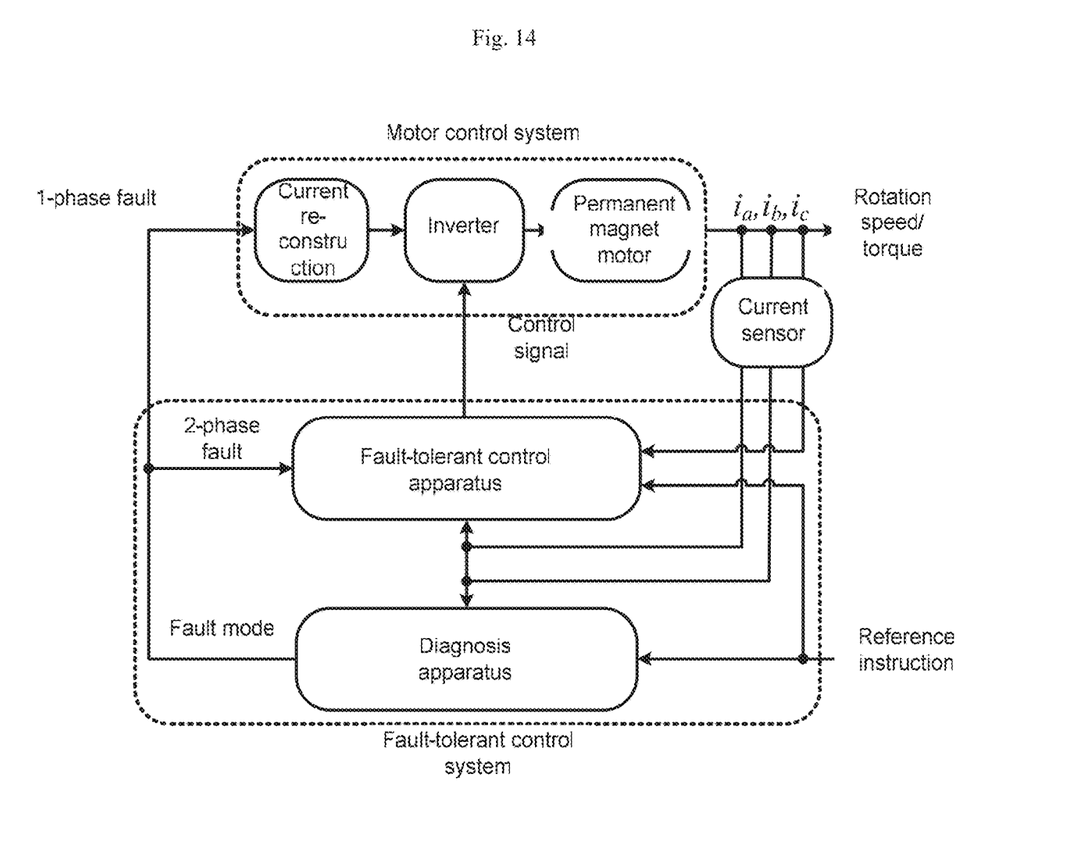
FIG. 14 is a block diagram of a fault-tolerant control system involved in an example of the disclosure.

With a three-phase motor as an example, as shown in FIG. 14, in a case of diagnosing a current sensor for only one phase of a three-phase current as having a fault, according to a theory that the sum of three-phase stator currents is zero, corresponding currents are re-constructed by the other two measured stator currents, and thus the fault-tolerant control of the sensors is realized. In a case of diagnosing current sensors for two phases of a three-phase current as having faults, the current observer outputs an observed current signal, a feedback current signal path is rapidly switched, inaccurate measurement values are replaced by the observed current signal, and thus the fault-tolerant control of the sensors is realized.

The above examples merely express particular embodiments of the disclosure, and has specific and detailed descriptions, but cannot be interpreted as limiting the scope of protection of the disclosure. It should be noted that those of ordinary skill in the art can also make several variations and improvements without departing from the concept of the technical solution of the disclosure, and these variations and improvements fall within the scope of protection of the disclosure.

What is claimed is:

1. An online fault identification method for a current sensor, comprising defining a fault of the current sensor, and setting a corresponding label; then simulating a motor drive system, so as to obtain operation data in a normal mode and a fault mode, and making a data set; designing a neural network, and performing optimization processing on the neural network through the data set, so as to obtain an intelligent diagnosis model; and finally deploying the intelligent diagnosis model in an edge apparatus, so as to perform real-time online diagnosis on the fault of the current sensor; wherein the fault of the current sensor comprises a saturation fault and a noise fault, wherein the saturation fault is defined as follows:

$$i(t) = \begin{cases} i_x(t), 0 \le t \le t_f \\ Max_c, i_x(t) \ge Max_c, t \ge t_f \\ i_x(t), Min_c \le i_x(t) \le Max_c, t \ge t_f \\ Min_c, i_x(t) \le Min_c, t \ge t_f \end{cases};$$

the noise fault is defined as follows:

$$i(t) = \begin{cases} i_x(t), 0 \le t \le t_f \\ i_x(t) + \varphi(t), t \ge t_f \end{cases};$$

wherein
i(t) denotes an output current, $i_x(t)$ denotes a normal current without a fault, $t_f$ denotes a moment when the fault occurs, $Max_c$ and $Min_c$ denote a maximum limit and a minimum limit of the current sensor respectively, and φ(t) denotes a noise of the sensor;
wherein the fault of the current sensor further comprises a stuck fault, a disconnection fault, a zero drift fault, and a gain fault; the stuck fault is defined as:

$$i(t) = \begin{cases} i_x(t), 0 \le t \le t_f \\ K_s, t \ge t_f \end{cases};$$

the disconnection fault is defined as follows:

$$i(t) = \begin{cases} i_x(t), 0 \le t \le t_f \\ 0, t \ge t_f \end{cases};$$

the zero drift fault is defined as follows:

$$i(t) = \begin{cases} i_x(t), 0 \le t \le t_f \\ i_x(t) + K_z, t \ge t_f \end{cases};$$

and the gain fault is defined as follows:

$$i(t) = \begin{cases} i_x(t), 0 \le t \le t_f \\ Gi_x(t), t \ge t_f \end{cases};$$

i(t) denotes an output current, $i_x(t)$ denotes a normal current without a fault, $t_f$ denotes a moment when the fault occurs, and $K_s$, $K_z$, and G denote coefficients of the stuck fault, the zero drift fault, and the gain fault respectively;

wherein deploying the intelligent diagnosis model in an edge apparatus, so as to perform real-time online diagnosis on the fault of the current sensor, comprises:

in actual operation, transmitting real-time data to the edge apparatus via a serial communication line, so that the intelligent diagnosis model deployed in the edge apparatus is used to perform real-time online diagnosis on the fault of the current sensor.

2. The online fault identification method for the current sensor according to claim 1, wherein a process for making the data set comprises: collecting the operation data in different modes; then performing labeling processing according to corresponding mode conditions; and finally injecting a noise signal into labeled data, so as to form the data set; wherein a length L of a signal collected is calculated as follows:

$$f_{Sc} = \frac{N_r p_n}{60}, T_{Sc} = \frac{1}{f_{Sc}};$$
$$L = f_{Sa} \times T_{Sc}$$

wherein
$P_n$ denotes a number of pole pairs, $N_r$ denotes a rotation speed of a rotor, $f_{Sa}$ denotes a sampling frequency, $f_{Sc}$ denotes a fundamental frequency of a stator current of a motor, and $T_{Sc}$ denotes an operation cycle of the motor.

3. The online fault identification method for the current sensor according to claim 1, wherein the optimization processing comprises: a, fusing, in a case that the data set comprise an electrical signal and a mechanical signal, the electrical signal with the mechanical signal, and inputting a fused signal into a plurality of feature map channels of a neural network model; b, training and optimizing the neural network model through an optimization algorithm, so as to obtain an intermediate model; and c, performing lightweight processing on the intermediate model, so as to obtain the intelligent diagnosis model.

4. The online fault identification method for the current sensor according to claim 3, wherein the training and optimizing the neural network model comprises training and evaluating the network through an adaptive moment estimation with weight decay (AdamW) algorithm, and automatically searching for an optimal hyperparameter of the network through an Optuna module, so as to obtain the intermediate model; and the lightweight processing comprises transforming the intermediate model into an open neural network exchange (ONNX) model, and then performing lightweight optimization and data quantization on the ONNX model through TensorRT.

5. The online fault identification method for the current sensor according to claim 1, wherein the intelligent diagnosis model is configured with an anti-misdiagnosis threshold, and in a case that a number of continuous diagnosis of one of the saturation fault and the noise fault reaches the anti-misdiagnosis threshold, occurrence of the type of fault is determined.

6. A diagnosis apparatus, comprising a memory, a compiler, and a microprocessor; wherein the memory stores an intelligent diagnosis model generated through an online fault identification method for a current sensor; the compiler compiles the intelligent diagnosis model in the memory into an inference engine; and the microprocessor performs online real-time diagnosis on a fault condition of the current sensor through the inference engine;

wherein the online fault identification method for the current sensor comprises:

defining a fault of the current sensor, and setting a corresponding label; then simulating a motor drive system, so as to obtain operation data in a normal mode and a fault mode, and making a data set; designing a neural network, and performing optimization processing on the neural network through the data set, so as to obtain an intelligent diagnosis model; and finally deploying the intelligent diagnosis model in an edge apparatus, so as to perform real-time online diagnosis on the fault of the current sensor; wherein the fault of the current sensor comprises a saturation fault and a noise fault wherein the saturation fault is defined as follows:

$$i(t) = \begin{cases} i_x(t), 0 \le t \le t_f \\ Max_c, i_x(t) \ge Max_c, t \ge t_f \\ i_x(t), Min_c \le i_x(t) \le Max_c, t \ge t_f \\ Min_c, i_x(t) \le Min_c, t \ge t_f \end{cases};$$

the noise fault is defined as follows:

$$i(t) = \begin{cases} i_x(t), 0 \le t \le t_f \\ i_x(t) + \varphi(t), t \ge t_f \end{cases};$$

wherein
i(t) denotes an output current, $i_x(t)$ denotes a normal current without a fault, $t_f$ denotes a moment when the fault occurs, $Max_c$ and $Min_c$ denote a maximum limit and a minimum limit of the current sensor respectively, and $\varphi(t)$ denotes a noise of the sensor;

wherein the fault of the current sensor further comprises a stuck fault, a disconnection fault, a zero drift fault, and a gain fault; the stuck fault is defined as:

$$i(t) = \begin{cases} i_x(t), 0 \le t \le t_f \\ K_s, t \ge t_f \end{cases};$$

the disconnection fault is defined as follows:

$$i(t) = \begin{cases} i_x(t), & 0 \le t \le t_f \\ 0, & t \ge t_f \end{cases} ;$$

the zero drift fault is defined as follows:

$$i(t) = \begin{cases} i_x(t), & 0 \le t \le t_f \\ i_x(t) + K_z, & t \ge t_f \end{cases} ;$$

and the gain fault is defined as follows:

$$i(t) = \begin{cases} i_x(t), & 0 \le t \le t_f \\ Gi_x(t), & t \ge t_f \end{cases} ;$$

wherein
  i(t) denotes an output current, $i_x$(t) denotes a normal current without a fault, $t_f$ denotes a moment when the fault occurs, and $K_s$, $K_z$, and G denote coefficients of the stuck fault, the zero drift fault, and the gain fault respectively;
  wherein deploying the intelligent diagnosis model in an edge apparatus, so as to perform real-time online diagnosis on the fault of the current sensor, comprises:
  in actual operation, transmitting real-time data to the edge apparatus via a serial communication line, so that the intelligent diagnosis model deployed in the edge apparatus is used to perform real-time online diagnosis on the fault of the current sensor.

7. A fault-tolerant control system, comprising the diagnosis apparatus according to claim 6 and a fault-tolerant control apparatus; wherein the fault-tolerant control apparatus is configured to provide a corresponding fault-tolerant strategy on the basis of a fault condition, so as to control a motor control system.

8. The fault-tolerant control system according to claim 7, wherein the fault-tolerant control apparatus comprises a current observer and a control module; in a case of diagnosing a current sensor for only one phase in a motor as having a fault, according to a theory that the sum of stator currents is zero, the control module re-constructs a stator current having a fault through a stator current without a fault; and in a case of diagnosing current sensors for two or more phases in a motor as having faults, the current observer outputs an observed current signal, a feedback current signal path is rapidly switched, and inaccurate measurement values of the current sensors are replaced by the observed current signal.

9. The diagnosis apparatus according to claim 6, wherein a process for making the data set comprises: collecting the operation data in different modes; then performing labeling processing according to corresponding mode conditions; and finally injecting a noise signal into labeled data, so as to form the data set; wherein a length L of a signal collected is calculated as follows:

$$f_{Sc} = \frac{N_r p_n}{60}, T_{Sc} = \frac{1}{f_{Sc}} ;$$
$$L = f_{Sa} \times T_{Sc}$$

wherein
  $P_n$ denotes a number of pole pairs, $N_r$ denotes a rotation speed of a rotor, $f_{Sa}$ denotes a sampling frequency, $f_{Sc}$ denotes a fundamental frequency of a stator current of a motor, and $T_{Sc}$ denotes an operation cycle of the motor.

10. The diagnosis apparatus according to claim 6, wherein the optimization processing comprises: a, fusing, in a case that the data set comprise an electrical signal and a mechanical signal, the electrical signal with the mechanical signal, and inputting a fused signal into a plurality of feature map channels of a neural network model; b, training and optimizing the neural network model through an optimization algorithm, so as to obtain an intermediate model; and c, performing lightweight processing on the intermediate model, so as to obtain the intelligent diagnosis model.

11. The diagnosis apparatus according to claim 10, wherein the training and optimizing the neural network model comprises training and evaluating the network model through an adaptive moment estimation with weight decay (AdamW) algorithm, and automatically searching for an optimal hyperparameter of the network through an Optuna module, so as to obtain the intermediate model; and the lightweight processing comprises transforming the intermediate model into an open neural network exchange (ONNX) model, and then performing lightweight optimization and data quantization on the ONNX model through TensorRT.

12. The diagnosis apparatus according to claim 6, wherein the intelligent diagnosis model is configured with an anti-misdiagnosis threshold, and in a case that a number of continuous diagnosis of one of the saturation fault and the noise fault reaches the anti-misdiagnosis threshold, occurrence of the type of fault is determined.

\* \* \* \* \*